(12) United States Patent
Topsoe et al.

(10) Patent No.: US 6,852,138 B1
(45) Date of Patent: Feb. 8, 2005

(54) METHOD OF MAKING POLYMER ELECTROLYTE ELECTROCHEMICAL CELLS

(75) Inventors: Martin Topsoe, Odense (DK); Asa Wendsjo, Odense (DK); Steen Yde-Andersen, Odense (DK)

(73) Assignee: Danionics A/S, Odense (DK)

( * ) Notice: Subject to any disclaimer, the term of this patent is extended or adjusted under 35 U.S.C. 154(b) by 0 days.

(21) Appl. No.: 09/647,662

(22) PCT Filed: Mar. 29, 1999

(86) PCT No.: PCT/EP99/02102

§ 371 (c)(1),
(2), (4) Date: Feb. 2, 2001

(87) PCT Pub. No.: WO99/50923

PCT Pub. Date: Oct. 7, 1999

(30) Foreign Application Priority Data

Mar. 30, 1998 (GB) .............................. 9806831

(51) Int. Cl.$^7$ .......................... H01M 6/00; H01M 6/14; H01M 6/18
(52) U.S. Cl. ...................... 29/623.1; 429/300; 429/303; 429/338; 429/342; 429/343
(58) Field of Search ........................ 252/62.2; 29/623.1; 429/300, 303, 324, 337, 338, 342, 343

(56) References Cited

U.S. PATENT DOCUMENTS

| | | | |
|---|---|---|---|
| 5,296,318 A | | 3/1994 | Gozdz et al. |
| 5,418,091 A | | 5/1995 | Gozdz et al. ................ 429/252 |
| 5,681,357 A | * | 10/1997 | Eschbach et al. ........... 29/623.5 |
| 5,688,293 A | | 11/1997 | Oliver et al. |
| 5,705,084 A | * | 1/1998 | Kejha ......................... 252/62.2 |
| 6,080,511 A | * | 6/2000 | Kejha ......................... 429/303 |
| 6,299,653 B1 | * | 10/2001 | Hoshi et al. ................ 29/623.1 |

FOREIGN PATENT DOCUMENTS

| | | | |
|---|---|---|---|
| GB | 2260137 A | 4/1993 | |
| WO | WO 97/48106 | * 12/1997 | |
| WO | 98/28812 | 7/1998 | .......... H01M/10/40 |

* cited by examiner

*Primary Examiner*—Carol Chaney
*Assistant Examiner*—Tracy Dove
(74) *Attorney, Agent, or Firm*—Darby & Darby

(57) ABSTRACT

The invention relates to a method for the preparation of a polymer electrolyte electrochemical cell using an electrolyte precursor, said precursor comprising one or more solvents, one or more salts and a polymer which dissolves in the solvent at a first temperature ($T_{dissol}$) and which is capable of forming a gel on subsequent cooling following heating to a second temperature ($T_{gel}$). $T_{dissol}$ being lower than $T_{gel}$, which method comprises: (a) heating the electrolyte precursor to $T_{dissol}$; (b) optionally cooling the electrolyte precursor, (c) incorporating the electrolyte precursor into the electrochemical cell; (d) heating the electrochemical cell to $T_{gel}$; (e) cooling the polymer electrochemical cell to ambient temperature to bring about gelling of the polymer electrolyte. Preferably the polymer is a homopolymer or copolymer from the group of monomers of vinyl fluoride, vinylidenefluoride, trifluoroethylene, tetrafluoroethylene and hexafluoropropylene.

27 Claims, No Drawings

US 6,852,138 B1

METHOD OF MAKING POLYMER ELECTROLYTE ELECTROCHEMICAL CELLS

This application is a national phase application under 35 U.S.C. §371 of International Application No. PCT/EP99/02102, filed Mar. 29, 1999, which was published in English Oct. 7, 1999 as International Publication No. WO 99/50923, and claims the benefit of British Patent Application No. 9806831.5, filed Mar. 30, 1998.

FIELD OF THE INVENTION

This invention relates to a method of making polymer electrolyte electrochemical cells and to cells obtained thereby.

BACKGROUND OF THE INVENTION

The recent development of electrochemical cells based on lithium containing negative electrode structures has allowed the fabrication of cells of high energy density. Cells have been obtained, which display energy densities beyond 200 Wh/l and even 250 Wh/l has been reported.

In order to reach such high energy densities, the capacity utilization of the active materials in the cell should be high. As further high rate capabilities of the electrochemical cells are sought, electrolyte phases should provide low impedance.

Traditionally, high conductivity electrolytes have been liquid electrolytes and such electrolytes are used in lithium cells of intercalation compound electrodes. The positive electrode structures are based on transition metal oxides operating at a potential close to 4V vs. Li/Li$^+$. Negative electrode structures of carbons and graphites may be applied, which reversibly intercalate lithium at a potential close to the potential of metallic lithium. Such cells are referred to as lithium-ion cells, as the active lithium is always in its ionic form. Alternatively, negative electrode structures of alloys such as Li—Al and Li—Sn may be used. Such cells will be referred to as lithium-alloy cells. All of the above configurations provide voltages close to 4V.

As high energy density and high rate capability imply reduced safety, an important objective in the development of such electrochemical cells has been to improve the safety aspects of the use of such cells.

The main improvement in terms of safety has been the substitution of carbon or alloy structures for the pure lithium metal negative electrode structures. During operation of lithium metal based negative electrodes, dendrites form, which penetrate the cell separator and shorten the cell. Although the risk of dendrite formation cannot be completely ignored in lithium-ion or lithium-alloy cells, especially during high-rate charging, the risk is strongly reduced compared to lithium metal cells.

Another problem associated with the liquid electrolytes traditionally applied is leakage of the electrolyte. The leakage may not only lead to cell failure but penetration of the corrosive fluid may destroy the electronic device in which the cell is used.

One approach to solve these problems has been the application of solid state electrolytes and the use of such electrolytes should eliminate the risk of dendrite formation and of electrolyte leakage.

U.S. Pat. No. 5,296,318 to Bell Communication Research describes the use of a polymer electrolyte based on polyvinylidenefluoride-hexafluoropropylene copolymer, which is present in the electrolyte phase in an amount corresponding to 30–80% by weight of the electrolyte system. Electrochemical cells based on such polymer electrolytes have significantly lower conductivity than cells based on a liquid electrolyte.

U.S. Pat. No. 5,418,091 to Bell Communication Research describes a multistep, process for the application of polymer electrolytes as described in U.S. Pat. No. 5,296,318.

The above patents illustrate the problem of solid state electrolytes, and in particular of polymer electrolytes which are the best ambient temperature candidate since their conductivity is too low. Due to the low conductivity of the polymer electrolytes, the performance of the electrochemical cells in which they are applied is significantly reduced compared to liquid electrolyte cells.

U.S. Pat. No. 5,688,293 to Oliver et al describes an electrochemical cell with a gel electrolyte which comprises a solvent and a gel forming polymer. The electrolyte was applied to the electrodes and gelled by heating.

U.S. Pat. No. 5,705,084 to Joseph Kejha discloses a composite solid state or semi-solid state polymer electrolyte for batteries, capacitors and other electrochemical devices, wherein the electrolyte mixture contains polyethylene oxide, polyvinylidenefluoride/hexafluoropropylene, a salt and at least one aprotic liquid. In a preferred embodiment the electrolyte comprises polyvinylidenefluoride/hexafluoropropylene in an amount in the range 0.1–70% and polyethylene oxide in an amount in the range 0.5–70% by weight of the electrolyte system, respectively. The patent discloses the coating of electrodes with solutions of the above electrolyte, prepared at 60–90° C., and the subsequent thickening of the electrolyte upon solvent evaporation. The patent, however, does not mention anything about changes in the rheological behaviour of the electrolyte other than those brought about by evaporation of the solvent.

WO 98/28812 to Danionics discloses a lithium secondary battery comprising an immobilized electrolyte containing one or more alkali metal salts, one or more non-aqueous solvents and an immobilizing polymer, wherein the immobilizing polymer is selected from the group consisting of cellulose acetates, cellulose acetate butyrates, cellulose acetate propionates, polyvinylidene fluoride-hexafluoropropylenes and polyvinylpyrrolidone-vinyl acetates with the proviso that in the case of polyvinylidene fluoride-hexafluoropropylenes, the polymer is present in an amount of at most 12% by weight based on the weight of the salts, solvents and polymer of the electrolyte system. The specification discloses a method for the preparation of a lithium secondary battery comprising the steps of solvent mixing, salt dissolution, addition of immobilizing polymer and sandwiching of the electrode between positive and negative electrodes. However, the specification does not mention the rheological behaviour of the electrolyte.

Therefore, there is a pressing need for polymer electrolytes and process technology therefor, which will provide electrochemical cells of high performance and safety, and which can be applied by a simple, low cost process.

It is thus an object of the present invention to provide such polymer electrolytes, which display performance similar to liquid electrolytes with improved safety, and processes therefor, which are simpler than traditional processing of polymer electrolytes.

DETAILED DESCRIPTION OF THE INVENTION

The present invention relates to a polymer electrolyte which has a significantly lower polymer content than traditional polymer electrolytes but which can be processed according to a simple temperature scheme.

Surprisingly it has been found, that a range of polymer electrolytes exist, based for example on fluorocarbons, which upon heating to a certain dissolution temperature $T_{dissol}$ produce low viscosity solutions. Such solutions are stable between room temperature and the above $T_{dissol}$. When additionally heated to a gelling temperature $T_{gel}$, $T_{gel} > T_{dissol}$, they undergo a transition, such that upon cooling they form gels of significantly higher viscosity than the original solution.

Accordingly, the present invention provides a method for the preparation of a polymer electrolyte electrochemical cell using an electrolyte precursor, said precursor comprising one or more solvents, one or more salts and a polymer which dissolves in the solvent at a first temperature ($T_{dissol}$) and which is capable of forming a gel on subsequent cooling following heating to a second temperature ($T_{gel}$), $T_{dissol}$ being lower than $T_{gel}$, which method comprises:

(a) heating the electrolyte precursor to $T_{dissol}$;

(b) optionally cooling the electrolyte precursor;

(c) incorporating the electrolyte precursor into the electrochemical cell;

(d) heating the electrochemical cell to $T_{gel}$ (e) cooling the polymer electrochemical cell to ambient temperature to bring about gelling of the polymer electrolyte.

As used herein, a gel is defined as a system of which the modulus of elasticity is higher than the modulus of loss, i.e. it has dominating elastic properties over viscous properties.

The processing scheme referred to above is preferably applied to polymer electrolytes with a polymer content in the range of 1–12% by weight of the electrolyte system. The electrolytes are then easily processable in that they are treated as liquid electrolytes until the final process step, during which the gelling takes place.

Thus, according to the present invention an electrolyte precursor comprising one or more solvents, one or more salts and a polymer having the features referred to above is heated to a temperature sufficient for the dissolution of the polymer in the solvent(s). This temperature, $T_{dissol}$, however, should not exceed the temperature, at which gelling of the polymer takes place upon subsequent cooling. Subsequently, the electrolyte precursor solution is incorporated into the electrochemical cell at a temperature in the range from room temperature to $T_{dissol}$. Following incorporation, the electrochemical cell is heated to a temperature $T_{gel}$. Upon subsequent cooling from $T_{gel}$ to room temperature, significant gelling of the electrolyte takes place, and the resulting polymer electrolyte has a significantly higher viscosity than the precursor.

In a preferred embodiment of the invention the polymer is a homopolymer or copolymer from the group of monomers of vinyl fluoride, vinylidenefluoride, trifluoroethylene, tetrafluoroethylene and hexafluoropropylene, preferably a copolymer of vinylidenefluoride and hexafluoropropylene, more preferably a copolymer of vinylidenefluoride and hexafluoropropylene of a molar weight in the range 50,000–500,000, more preferably 100,000–300,000, and a weight ratio of vinylidenefluoride and hexafluoropropylene in the range 80:20 to 90:10.

In a preferred embodiment of the present invention the electrolyte comprises one or more solvent(s) selected from the groups (a) to (e):

(a) alicyclic carbonates represented by the following general formula:

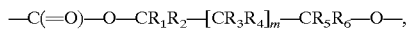

wherein each of $R_1$, $R_2$, $R_3$, $R_4$, $R_5$, and $R_6$ independently represents hydrogen or a $C_1$–$C_4$ alkyl group and m is 0 or 1, preferably ethylene carbonate or propylene carbonate;

(b) aliphatic carbonates represented by the general formula $R_7[OC(O)]_p OR_8$, wherein each of $R_7$ and $R_8$ independently represents a $C_1$–$C_4$ alkyl group, and p is an integer equal to 1 or 2, preferably dimethyl carbonate or diethyl carbonate;

(c) lactones in the form of cyclic esters represented by the general formula:

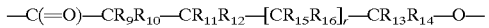

wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1, preferably γ-valerolactone or γ-butyrolactone;

(d) esters represented by the formula $R_{17}[C(O)]OR_{18}[OR_{19}]_t$, wherein each of $R_{17}$, $R_{18}$ and $R_{19}$ independently represents hydrogen or a $C_1$–$C_2$ alkyl group, and t is 0 or an integer equal to 1 or 2, preferably an acetate, more preferably (2-methoxyethyl)-acetate or ethyl acetate;

(e) glymes represented by the general formula $R_{20}O(R_{21}O)_n R_{22}$, in which each of $R_{20}$ and $R_{22}$ independently represents a $C_{1-2}$ alkyl group, $R_{21}$ is —$(CR_{23}R_{24}CR_{25}R_{26})$— wherein each of $R_{23}$, $R_{24}$, $R_{25}$ and $R_{26}$ independently represents hydrogen or a $C_1$–$C_4$ alkyl group, and n is an integer from 2 to 6, preferably 3, $R_{20}$ and $R_{22}$ preferably being methyl groups, $R_{23}$, $R_{24}$, $R_{25}$, and $R_{26}$ preferably being hydrogen or $C_1$–$C_2$ alkyl groups, more preferably hydrogen.

In a preferred embodiment of the invention the salt of the electrolyte is selected from the group of alkali metal or ammonium salts of $ClO_4^-$, $CF_3SO_3^-$, $AsF_6^-$, $PF_6^-$ or $BF_4^-$, preferably $LiPF_6$ and $LiBF_4$.

In a preferred embodiment of the invention the electrolyte precursor comprises solvent(s), salts(s) and polymer(s) in the compositional range from 63:25:12 to 94:5:1 percent of the total weight of the electrolyte system, preferably in the compositional range from 70:20:10 to 90:8:2 percent of the total weight of the electrolyte system, more preferably in the compositional range from 75:17:8 to 88:8:4 percent of the total weight of the electrolyte system.

In a preferred embodiment of the invention the dissolution temperature is in the range 45–80° C. preferably 60–80° C., more preferably 65–75° C., and the gelling temperature is in the range 75–100° C., preferably 80–90° C., with the proviso, that the gelling temperature should be higher than the dissolution temperature.

In a preferred embodiment of the invention the electrochemical cell comprises any one of the electrolytes as described above. The electrolyte may be confined in a separator consisting of a porous structure made of a polymer, preferably of polyethylene, polypropylene, polycarbonate or cellulose, the separator having a woven or non-woven structure having a pore size in the range of 10×10 nm to 1×1 mm and a thickness of 10–100 μm, preferably 10–25 μm. The cell further comprises a negative electrode structure comprising one or more compounds selected from the group of graphite, coke, mesocarbon microbeads, carbon black, aluminium, silicon or tin, and a positive electrode structure comprising one or more compounds selected from the group of lithium manganese oxides, lithium cobalt oxides and lithium nickel oxides.

In a further preferred embodiment the electrodes display a porosity which is such as to allow diffusion of a relatively solvent-rich electrolyte phase into the pores of the electrodes, leaving a relatively polymer-rich electrolyte phase in the volume between the electrodes. Such separation of the electrolyte in a pore-phase and a bulk-phase further reduces the risk of electrolyte leakage. In the case of cell puncture, the low viscosity electrolyte phase will be bound in the pores and will not leak from the cell. Similarly, the high viscosity bulk phase will be bound between the electrodes.

In a preferred embodiment of the invention the incorporation of the electrolyte is applied on a wound cell, i.e. the winding of the cell is done prior to electrolyte impregnation. Such cell can be efficiently impregnated with the low viscosity electrolyte obtained from the first step of the present invention. The impregnation of wound cells further allows improved control of the solvent evaporation, i.e. the solvent-composition is substantially unchanged during the process, even in the case of low boiling solvents such as dimethyl carbonate and diethyl carbonate.

In a further preferred embodiment of the invention the electrolyte incorporation is carried out by a simple pouring or injection process.

It has also been found that a further separation of the electrolyte can occur when the electrolyte is filled into cell-laminates, and that this further separation can also be applied to advantageous effect. This separation arises because the gap between the electrode laminates is (or can be made) smaller than at least the largest polymer particles and the result is that electrolyte in the vicinity of the edge of the laminate and outside the laminate contains a larger amount of polymer than the electrolyte between the electrodes. This has the advantage that after gelling, the electrolyte in the vicinity of the edge of the laminate is effectively solidified and thus prevents the possibility of short circuits in this sensitive area. It is thus possible to keep the electrolyte between the electrodes in a gelled state, or even in a liquid state, with minimum risk of leakage. The ratio of the distribution of polymer can be controlled by applying more or less pressure on the electrode laminate during the course of the filling process.

The invention also provides an electrochemical cell characterised by a negative electrode structure comprising one or more compounds selected from the group of graphite coke and mesocarbon microbeads and a positive electrode structure comprising one or more compounds selected from the group of lithium manganese oxides, lithium cobalt oxides and lithium nickel oxides, preferably lithium manganese oxide, and a gelled polymer electrolyte, 1–12% by weight, preferably 4–8% by weight, of the total weight of the electrolyte being said polymer, which is selected from the group of homopolymers and copolymers from the group of monomers of vinyl fluoride, vinylidenefluoride, trifluoroethylene, tetrafluoroethylene and hexafluoropropylene, preferably a copolymer of vinylidenefluoride and hexafluoropropylene, the electrochemical cell having been obtained by or being obtainable by a method as defined above.

EXAMPLES

Example 1

A lithium secondary battery was prepared from a negative electrode laminate of a polymer bound carbon coated onto a copper current collector, a positive electrode laminate of a polymer bound lithium manganese oxide spinel coated onto an aluminium current collector, and an electrolyte.

The carbon was R-LIBA-A (product of Timcal, Switzerland). The lithium magnesium oxide spinel was prepared by a solid state reaction at 800° C. from $Li_2CO_3$ and $MnO_2$ and had a specific capacity of 120 mAh/g. In the case of both electrodes, the polymeric binder was EPDM (ethylene propylene diene polymethylene).

The battery laminate was wound from the above negative and positive electrode laminates and a microporous polyethylene separator. The entire battery laminate was placed in plastic-coated aluminium "coffee-bag" container.

The electrolyte was prepared by mixing ethylene carbonate (EC) and diethyl carbonate (DEC) in a volume ratio of 2:1, adding $LiBF_4$ and $LiPF_6$ (60% to 40% by mole) to obtain a 1M solution of $LiBF_4/LiPF_6$ in EC/DEC, heating the above liquid electrolyte solution to 70° C., and adding at this temperature 5% by weight of polyvinylidene fluoride-hexafluoropropylene (PVDF/HFP) (KYNERFLEX 2822 from Elf Atochem) to the solution to obtain a 5% by weight solution of PVDF/HFP in 1M $LiBF_4/LiPF_6$ in EC/DEC. The polymer electrolyte was stirred at 70° C. for 10 minutes before cooling to room temperature.

During these last stages, in the temperature range room temperature –70° C., the polymer electrolyte is in a liquid state.

The liquid polymer electrolyte was injected into the battery laminate at ambient temperature. Subsequently, the battery was heated to 85° C. for ten minutes. The battery was allowed to cool to room temperature.

At this stage, the polymer electrolyte had gelled, displaying in the bulk phase between the electrodes a viscosity significantly higher than that observed for the original polymer electrolyte.

The battery prepared had an active electrode area of 365 $cm^2$ and, subsequent to charging to 4.2V, an internal impedance of 49 mΩ at 1 kHz. When cycled between 4.2V and 2.5V at 500 mA, the battery displayed an initial capacity of 358 mAh. After 400 cycles, the capacity was 299 mAh, say 84% of the initial capacity. At 1.25 A discharge rate, an initial capacity of 210 mAh was observed.

Upon nail penetration (Ø=5 mm, F=6000N) the battery short-circuited, however, no leakage of electrolyte was observed on the surface of the battery upon visual inspection.

Comparative Example 1a

A battery laminate was produced and packed according to example 1 and liquid state polymer electrolyte was prepared also according to example 1.

The liquid polymer electrolyte was injected into the battery laminate at room temperature. Compared to example 1, the battery was not heated subsequent to the electrolyte injection.

The battery having the same dimensional characteristics as the battery of example 1, had an internal impedance of 42 mΩ at 1 kHz. When cycled between 4.2V and 2.5V at 500 mA, the battery displayed an initial capacity of 408 mAh. After 400 cycles, the capacity was 343 mAh, say 84% of the initial capacity. At 1.25 A discharge rate, an initial capacity of 280 mAh was observed.

Upon nail penetration (Ø=5 mm, F=6000N) the battery short-circuited. Leakage of electrolyte was observed on the surface of the battery upon visual inspection.

Comparative Example 1b

A battery laminate was produced and packed according to example 1.

The electrolyte was prepared by mixing ethylene carbonate (EC) and diethyl carbonate (DEC) in a volume ratio of 2:1, adding $LiBF_4$ and $LiPF_6$ (60% to 40% by mole) to obtain a 1M solution of $LiBF_4/LiPF_6$ in EC/DEC, and adding at room temperature 5% by weight of polyvinylidene fluoride-hexafluoropropylene (PVDF/HFP) (KYNERFLEX 2822 from Elf Atochem) to the solution to obtain a 5% by weight solution of PVDF/HFP in 1M $LiBF_4/LiPF_6$ in EC/DEC. The polymer electrolyte was stirred at room temperature for 10 min. during which partial dissolution of the polymer was observed.

The polymer electrolyte was injected into the battery laminate at ambient temperature. It was observed, that the distribution of electrolyte within the battery laminate was poorer compared to examples 1 and 1a, as undissolved polymer was blocking the pores. Subsequently, the battery was heated to 85° C. for ten minutes and the battery then allowed to cool to room temperature. The polymer electrolyte was gelled, displaying in the bulk phase between the electrodes a viscosity significantly higher than observed for the free polymer electrolyte.

The battery having the same dimensional characteristics as the batteries of examples 1 and 1a had an internal impedance of 150 mΩ at 1 kHz. When cycled between 4.2V and 2.5V at 500 mA, the battery displayed an initial capacity of 280 mAh. After 100 cycles, the capacity was 176 mAh, say 63% of the initial capacity. At 1.25 A discharge rate, an initial capacity of 138 mAh was observed.

Upon nail penetration (Ø=5 mm, F=6000N) the battery short-circuited, however, no leakage of electrolyte was observed on the surface of the battery upon visual inspection.

Comparative Example 1c

A battery laminate was produced and packed according to example 1.

The electrolyte was prepared by mixing ethylene carbonate (EC) and diethyl carbonate (DEC) in a volume ratio of 2:1, adding $LiBF_4$ and $LiPF_6$ (60% to 40% by mole) to obtain a 1M solution of $LiBF_4/LiPF_6$ in EC/DEC.

The electrolyte was injected into the above battery laminate at ambient temperature. No gelling of the electrolyte was observed.

The battery having the same dimensional characteristics as the battery of example 1, had an internal impedance of 38 mΩ at 1 kHz. When cycled between 4.2V and 2.5V at 500 mA, the battery displayed an initial capacity of 421 mAh. After 400 cycles, the capacity was 362 mAh, say 86% of the initial capacity. At 1.25 A discharge rate, an initial capacity of 360 mAh was observed.

Upon nail penetration (Ø=5 mm, F=6000N) the battery short-circuited. Leakage of electrolyte was observed on the surface of the battery upon visual inspection.

Example 2

A lithium secondary battery was prepared as described in Example 1 except that the carbon was MCMB 10–28 (product of Osaka Gas Chemical Ltd.) and that the electrolyte was prepared by mixing ethylene carbonate (EC) and diethyl carbonate (DEC) in a volume ratio of 1:1 adding $LiBF_4$ and $LiPF_6$ (60% to 40% by mole) to obtain a 1M solution of $LiBF_4/LiPF_6$ in EC/DEC, heating the above liquid electrolyte solution to 57° C., and adding at this temperature 2.5% by weight of polyvinylidene fluoride-hexafluoropropylene (PVDF/HFP) (KYNERFLEX 2822 from Elf Atochem) to the solution to obtain a 2.5% by weight solution of PVDF/HFP in 1M $LiBF_4/LiPF_6$ in EC/DEC. The polymer electrolyte was stirred at 57° C. for 10 minutes before cooling to room temperature.

During these last stages, in the temperature range room temperature to -57° C., the polymer electrolyte is in its liquid state.

The liquid polymer electrolyte was injected into the above battery laminate at ambient temperature. Subsequently, the battery was heated to 85° C. for 10 minutes. The battery was allowed to cool to room temperature.

At this stage, the polymer electrolyte had gelled, displaying in the bulk phase between the electrodes a viscosity significantly higher than observed for the original polymer electrolyte.

The battery prepared had an active, electrode area of 1500 cm² and, subsequent to charging to 4.2V, an internal impedance of 16 mΩ at 1 kHz. When cycled between 4.2V and 3.0V at 3000 mA, the battery displayed an initial capacity of 2970 mAh. After 300 cycles, the capacity was 2550 mAh, say 86% of the initial capacity. At 6.0 A discharge rate, an initial capacity of 2700 mAh was observed.

Upon nail penetration (Ø=5 mm, F=6000N) the battery short-circuited, however, no leakage of electrolyte was observed on the surface of the battery upon visual inspection.

What is claimed is:

1. A method for the preparation of a polymer electrolyte electrochemical cell using an electrolyte precursor, said precursor comprising one or more solvents, one or more salts and a polymer which dissolves in the solvent at a first temperature, $T_{dissol}$, and which is capable of forming a gel on subsequent cooling following heating to a second temperature, $T_{gel}$, wherein $T_{dissol}$ is lower than $T_{gel}$, which method comprises:

heating the electrolyte precursor to $T_{dissol}$;

(a) optionally cooling the electrolyte precursor;

(b) incorporating the electrolyte precursor into the electrochemical cell;

(c) heating the electrochemical cell to $T_{gel}$; and (d) cooling the polymer electrochemical cell to ambient temperature to bring about gelling of the polymer electrolyte.

2. The method according to claim 1, in which said polymer is a homopolymer or copolymer selected from the group of monomers consisting of vinyl fluoride, vinylidenefluoride, trifluoroethylene, tetrafluoroethylene and hexafluoropropylene.

3. The method according to claim 1, in which said polymer is a copolymer of vinylidenefluoride and hexafluoropropylene.

4. The method according to claim 3, in which said copolymer of vinylidenefluoride and hexafluoropropylene has a molecular weight in the range 50,000–500,000, and a weight ratio of vinylidenefluoride and hexafluoropropylene in the range 80:20 to 90:10.

5. The method according to claim 1, in which the electrolyte comprises one or more solvent(s) selected from the group consisting of:

(a) alicyclic carbonates represented by the following general formula:

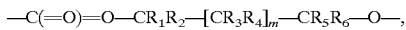

wherein each of $R_1$, $R_2$, $R_3$, $R_4$, $R_5$ and $R_6$ independently represents hydrogen or a $C_1$–$C_4$ alkyl group and m is 0 or 1;

(b) aliphatic carbonates represented by the general formula $R_7[OC(O)]_pOR_8$, wherein each of $R_7$ and $R_8$ independently represents a $C_1$–$C_4$ alkyl group, and p is an integer equal to 1 or 2;

(c) lactones in the form of cyclic esters represented by the general formula:

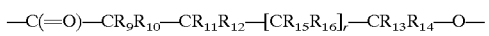

wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1;

(d) esters represented by the formula $R_{17}[C(O)]OR_{18}]_t$, wherein each of $R_{17}$, $R_{18}$ and $R_{19}$ independently represents hydrogen or a $C_1$–$C_2$ alkyl group, and t is 0 or an integer equal to 1 or 2; and (e) glymes represented by the general formula $R_{20}O(R_{21}O)_nR_{22}$, in which each of $R_{20}$ and $R_{22}$ independently represents a $C_{1-2}$ alkyl group, $R_{21}$ is —$(CR_{23}R_{24}CR_{25}R_{26})$— wherein each of $R_{23}$, $R_{24}$, $R_{25}$ and $R_{26}$ independently represents hydrogen or a $C_1$–$C_4$ alkyl groups, and n is an integer from 2 to 6.

6. The method according to claim 1, in which the electrolyte comprises one or more salts selected from the group consisting of alkali metal or ammonium salts of $ClO_4$, $CF_3SO_3$, $AsF_6$, $PF_6$ and $BF_4$.

7. The method according to claim 1, in which the electrolyte comprises solvent(s), salt(s) and polymer in the compositional range from 63:25:12 to 94:5:1 percent of the total weight of the electrolyte system.

8. The method according to claim 1 in which the electrolyte is confined in a separator consisting of a porous structure made of a polymer.

9. The method according to claim 8, in which the separator has a woven or non-woven structure having a pore size in the range of 10×10 nm to 1×1 mm.

10. The method according to claim 8, in which the separator has a thickness of 10–100 μm.

11. The method according to claim 1, in which the electrochemical cell has a negative electrode structure comprising one or more compounds selected from the group consisting of graphite, coke, mesocarbon microbeads, carbon black, aluminum, silicon and tin, and a positive electrode structure comprising one or more compounds selected from the group consisting of lithium manganese oxides, lithium cobalt oxides and lithium nickel oxides.

12. The method according to claim 1, in which the dissolution temperature $T_{dissol}$ is in the range 45–80° C. and the gelling temperature $T_{gel}$ is in the range 75–100° C., with the proviso that $T_{gel}$ should be higher than $T_{dissol}$.

13. The method according to claim 1, in which the electrochemical cell is wound prior to electrolyte impregnation.

14. The method according to claim 1, in which the electrolyte incorporation is carried out by pouring or injection.

15. The method according to claim 1, in which the electrodes display such a porosity which is such as to allow diffusion of a relatively solvent-rich electrolyte phase into the pores of the electrodes, leaving a relatively polymer-rich electrolyte phase in the volume between the electrodes.

16. The method according to claim 1 wherein the gap between electrode laminates of the electrochemical cell is smaller than at least the largest polymer particles so that the electrolyte in the vicinity of the edge of the laminate and outside the laminate contains a larger amount of polymer than the electrolyte between the electrodes.

17. The method according to claim 4, wherein the copolymer of vinylidenefluoride and hexafluoropropylene has a molecular weight in the range of 100,000–300,000.

18. The method according to claim 5, wherein the electrolyte comprises one or more solvents selected from the group consisting of (a) alicylic carbonates selected from the group consisting of ethylene carbonate and propylene carbonate;

(b) aliphatic carbonates selected from the group consisting of dimethyl carbonate and diethyl carbonate;

(c) lactones selected from the group consisting of γ-valerolactone and γ-butyrolactone;

(d) esters selected from the group consisting of (2-methoxyethylacetate) and ethylacetate; and (e) glymes wherein $R_{20}$ and $R_{22}$ are methyl and $R_{23}$, $R_{24}$, $R_{25}$ and $R_{26}$ are hydrogen.

19. The method according to claim 7, wherein the electrolyte comprises solvent(s), salt(s) and polymer in the compositional range 75:17:8 to 88:8:4 percent of the total weight of the electrolyte system.

20. The method according to claim 8, wherein the separator consists of a porous structure made of a polymer selected from the group consisting of polyethylene, polypropylene, polycarbonate, and cellulose.

21. The method according to claim 10, wherein the thickness is 10–25 μm.

22. The method according to claim 11, wherein the negative electrode structure comprises one or more compounds selected from the group consisting of graphite and mesocarbon microbeads; and the positive electrode structure comprises $LiMn_2O_4$ of spinel structure.

23. The method according to claim 12, wherein $T_{dissol}$ is in the range 65–75° C., and $T_{gel}$ is in the range of 80–90° C.

24. The method according to claim 6, wherein the electrolyte comprises one or more salts selected from the group consisting of $LiPF_6$ and $LiBF_4$.

25. An electrochemical cell having (i) a negative electrode structure comprising one or more compounds selected from the group consisting of graphite, coke and mesocarbon microbeads, (ii) a positive electrode structure comprising lithium manganese oxide, and (iii) a gelled polymer electrolyte, 1–12% by weight of the total weight of the electrolyte being said polymer, wherein said polymer is a homopolymer or copolymer selected from the group of monomers consisting of vinyl fluoride, vinylidenefluoride, trifluoroethylene, tetrafluoroethylene and hexafluoropropylene, said electrochemical cell being obtained by or being obtainable by a method comprising:

(a) heating an electrolyte precursor, comprising one or more solvents, one or more salts and a polymer which dissolves in the solvent at a first temperature, $T_{dissol}$, and which is capable of forming a gel on subsequent cooling following heating to a second temperature, $T_{gel}$, to the temperature $T_{dissol}$, wherein $T_{dissol}$ is lower than $T_{gel}$;

b) cooling the electrolyte precursor (c) incorporating the electrolyte precursor into the electrochemical cell;

(d) heating the cell to $T_{gel}$; and (e) cooling the polymer electrochemical cell to ambient temperature to bring about gelling of the polymer electrolyte.

26. An electrochemical cell having (i) a negative electrode structure comprising one or more compounds selected from the group consisting of graphite, coke, and mesocarbon microbeads, (ii) a positive electrode structure comprising one or more compounds selected form the group consisting of lithium manganese oxides, lithium cobalt oxides, and lithium nickel oxides, and (iii) a gelled polymer electrolyte, 1–12% by weight of the total weight of the electrolyte being said polymer, wherein said polymer is a copolymer of vinylidenefluoride and hexafluoropropylene, said electrochemical cell being obtained by or being obtainable by a method comprising:

(a) heating an electrolyte precursor, comprising one or more solvents, one or more salts and a polymer which dissolves in the solvent at a first temperature, $T_{dissol}$, and which is capable of forming a gel on subsequent cooling following heating to a second temperature, $T_{gel}$, to the temperature $T_{dissol}$, wherein $T_{dissol}$ is lower than $T_{gel}$;

(b) cooling the electrolyte precursor (c) incorporating the electrolyte precursor into the electrochemical cell;

(d) heating the cell to $T_{gel}$; and (e) cooling the polymer electrochemical cell to ambient temperature to bring about gelling of the polymer electrolyte.

27. An electrochemical cell having (i) a negative electrode structure comprising one or more compounds selected from the group consisting of graphite, coke, and mesocarbon microbeads, (ii) a positive electrode structure comprising one or more compounds selected form the group consisting of lithium manganese oxides, lithium cobalt oxides, and lithium nickel oxides, and (iii) a gelled polymer electrolyte, 4–8% by weight of the total weight of the electrolyte being said polymer, wherein said polymer is a homopolymer or copolymer selected from the group of monomers consisting of vinyl fluoride, vinylidenefluoride, trifluoroethylene, tetrafluoroethylene and hexafluoropropylene, said electrochemical cell being obtained by or being obtainable by a method comprising:

(a) heating an electrolyte precursor, comprising one or more solvents, one or more salts and a polymer which dissolves in the solvent at a first temperature, $T_{dissol}$, and which is capable of forming a gel on subsequent cooling following heating to a second temperature, $T_{gel}$, to the temperature $T_{dissol}$, wherein $T_{dissol}$ is lower than $T_{gel}$;

(b) cooling the electrolyte precursor (c) incorporating the electrolyte precursor into the electrochemical cell;

(d) heating the cell to $T_{gel}$; and (e) cooling the polymer electrochemical cell to ambient temperature to bring about gelling of the polymer electrolyte.

* * * * *